(12) United States Patent
Chanteau

(10) Patent No.: US 6,430,742 B1
(45) Date of Patent: Aug. 6, 2002

(54) DEVICE FOR DISTRIBUTING TELEVISION SIGNALS BY CABLE

(75) Inventor: Pierre Chanteau, La Haye Malherbe (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/132,402

(22) Filed: Aug. 11, 1998

(30) Foreign Application Priority Data

Aug. 27, 1997 (FR) .......................................... 97 10689

(51) Int. Cl.[7] .................................................. H04N 7/16
(52) U.S. Cl. ........................ 725/74; 725/138; 725/114; 725/103; 725/144; 725/78; 725/80; 455/129; 333/100
(58) Field of Search ............................ 725/67, 74, 91, 725/78, 98, 80, 103, 114, 118, 138, 144; 455/512, 129; 348/21, 553, 725, 584, 731, 706; 333/100, 124, 126, 129, 132

(56) References Cited

U.S. PATENT DOCUMENTS

| | | | | | |
|---|---|---|---|---|---|
| 5,068,918 A | * | 11/1991 | Verheijen et al. | ............ | 348/731 |
| 5,382,971 A | * | 1/1995 | Chanteau | ..................... | 725/144 |
| 5,574,964 A | * | 11/1996 | Hamlin | ........................ | 725/78 |
| 5,787,335 A | * | 7/1998 | Novak | ........................ | 725/151 |
| 5,790,202 A | * | 8/1998 | Kummer et al. | ............ | 348/553 |
| 5,835,128 A | * | 11/1998 | Macdonald et al. | .......... | 725/68 |
| 5,905,941 A | * | 5/1999 | Chanteau | ................... | 455/12.1 |

FOREIGN PATENT DOCUMENTS

EP  0583843 A1  8/1993  ............ H04N/7/10

* cited by examiner

Primary Examiner—Chris Grant
Assistant Examiner—Jason Salce
(74) Attorney, Agent, or Firm—Laurie E. Gathman

(57) ABSTRACT

A television signal distribution device comprises a plurality of downgoing cables (1–4) corresponding to signals received from various satellites (10–40). Signals received by terrestrial transmission (50, T) are added to each of these cables. Digital data signals received from different satellites are converted to a lower frequency in down-converters (DC1–DC5) and together brought to within the range of the terrestrial signals (T). For each group of users there is provided a converter (94) for putting the digital data signals into a customary frequency band which can be used by a standard satellite modem (95).

4 Claims, 1 Drawing Sheet

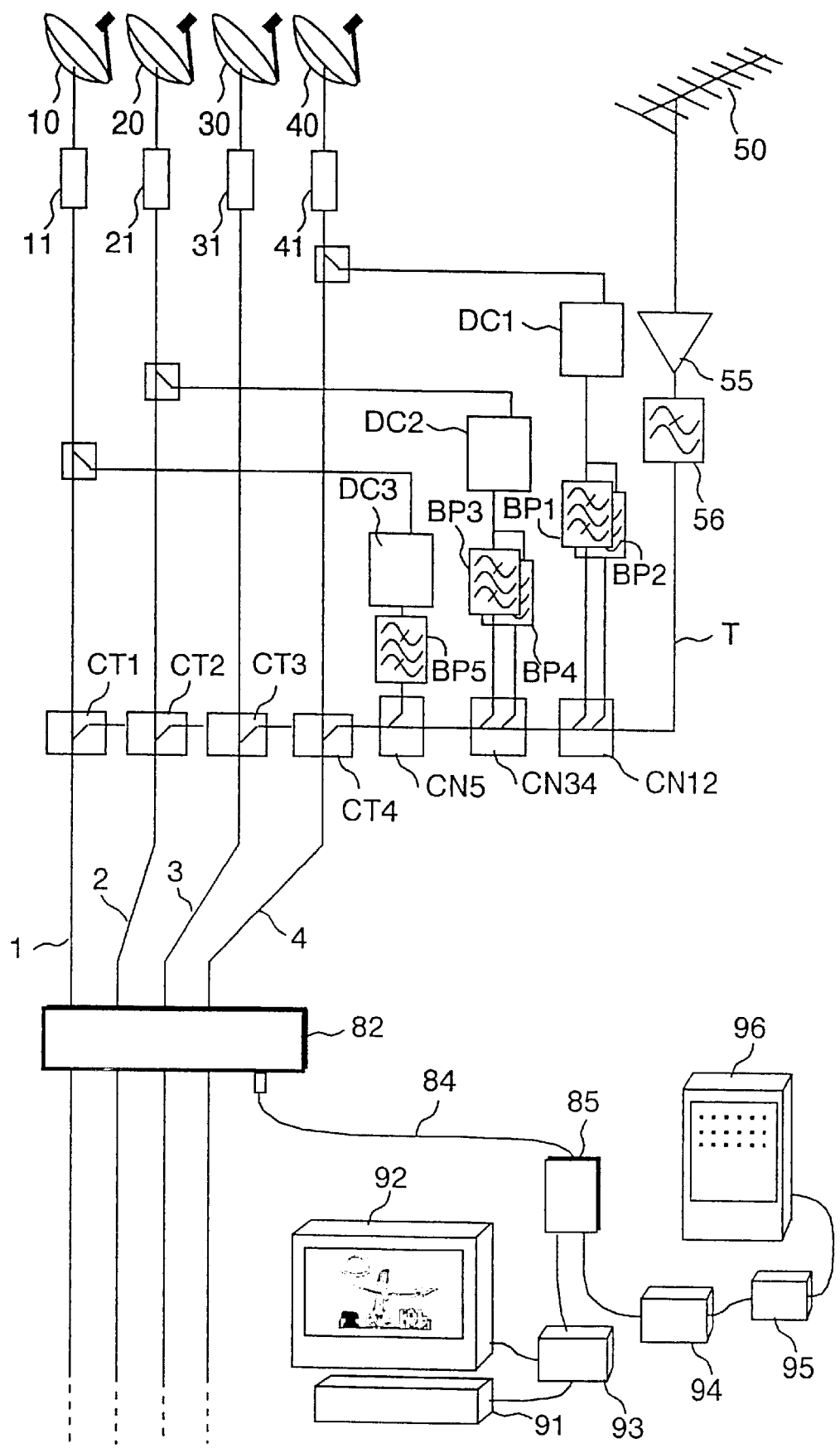

DEVICE FOR DISTRIBUTING TELEVISION SIGNALS BY CABLE

BACKGROUND OF THE INVENTION

1. Field of the Invention

The present invention relates to a head-end device for a television signal distribution system serving a plurality of user installations, intended to feed at least two downgoing cables and comprising:

- a set of various separate sources of television signals transmitted by satellite, called satellite sources, each of the downgoing cables being fed with different signals coming from satellite sources,
- a source of television signals transmitted by terrestrial channel, called terrestrial source, and
- couplers, called terrestrial signal couplers, for repeating the signals from the terrestrial source on each of the downgoing cables by adding them to the signals of a satellite source.

The invention also relates to a user connection device intended to supply signals to a user installation from a television signal distribution device according to the invention, having selection means for selecting one of the downgoing cables and connecting the installation thereto.

Such a distribution system, which finds an application in, for example, a residential building comprising a plurality of apartments is customarily called "MATV".

2. Description of the Related Art

A distribution system, comprising a head-end device and user connection devices as defined in the opening paragraph above, is known from patent application EP-A-0 583 843. According to this document, various cables divide up all the available satellite channels among them and the terrestrial cables are copied on all the cables, so that one is always in a position to watch a program transmitted by a terrestrial channel, whatever the cable chosen.

Digital data channels which can be used in computers are broadcast by certain satellites. If, in the same house one user wishes to watch a television broadcast coming from a certain satellite, that is to say, carried by a certain cable, whereas another user would like to work on a computer with the data transmitted by another satellite, that is to say, carried by another cable, there is a conflict. The invention notably has for its object to remedy this conflict.

SUMMARY OF THE INVENTION

For this purpose, a device according to the invention comprises at least a down-converter for selecting from a satellite source a signal that transports digital data so as to lower the signal frequency and bring the frequency to within the frequency range of the signals transmitted by the terrestrial source, and at least a coupler, called digital signal coupler, for inserting the signal that has a lowered frequency between those coming from the terrestrial source.

Thus, since the signals from the terrestrial source are copied on each of the downgoing cables, the data signals which are added thereto are also available on all the cables.

In an advantageous embodiment, the digital signal coupler is arranged upstream of the terrestrial signal couplers on a connection coming from the terrestrial source.

Thus, only one coupler is sufficient.

A user connection device includes at least an up-converter for increasing the frequency of the lower-frequency signals which transport digital data and for bringing their frequency to within the frequency range of the signals transmitted by satellite.

Thus it is possible to use a computer that has a standard modem provided for satellite links.

In an advantageous embodiment, the user connection device moreover includes a distributor for supplying signals coming from the selected cable to at least two separate user installations.

Thus, two users may simultaneously utilize each a different broadcast.

These and other aspects of the invention will be apparent from and elucidated with reference to the embodiments described hereinafter.

BRIEF DESCRIPTION OF THE DRAWING

The sole drawing FIGURE diagrammatically represents a cable television distribution system, with a head-end device according to the invention, downgoing cables, a user connection device according to the invention, and user installations.

DETAILED DESCRIPTION OF THE PREFERRED EMBODIMENTS

The installation for distributing television signals by cable represented in the FIGURE comprises a head-end which is formed here, for example, by four satellite dish antennas 10, 20, 30, 40 and by an antenna 50 for receiving signals received from terrestrial stations. Each of the satellite dish antennas is associated to an amplifier block and low-noise frequency converter block generally called "LNB" 11, 21, 31, 41 respectively, which forms a source of television signals transmitted by satellite. Each of these sources produces on its output signals in a frequency range running from 950 to 2150 MHz, and these signals are fed to a downstream cable that is different for each of the sources; there are four cables 1, 2, 3, 4 which serve, for example, premises in which there are a plurality of user installations. The number of cables depends on the requested number of channels to be received.

A sufficient number of channels may also be produced by a smaller number of dish antennas than four, there being a possibility of a single LNB having four outputs (low horizontal band, low vertical band, high horizontal band, high vertical band). In this case, one LNB constitutes a plurality of satellite signal sources.

Television signals transmitted by terrestrial channel, received by antenna 50, are amplified by an amplifier 55 which covers a range of frequencies running from 45 to 862 MHz and are sent over a cable T through a low-pass filter 56 whose cutoff frequency is about 900 MHz. These terrestrial signals are then applied both to the four cables 1–4 by means of the couplers CT1, CT2, CT3, CT4 and these cables, in addition to signals received from the satellite, each deliver all the signals received from terrestrial stations.

The installation additionally includes down-converters DC1 to DC3 which permit of taking from satellite sources at least one signal which transports digital data and the lowering of its frequency to bring the frequency to within the range of frequencies of the signals received by terrestrial channel. Here, for example, the down-converter DC1 receives from the satellite source 41 signals comprising, inter alia, digital data signals, lowers their frequency by known means which are not shown, such as an oscillator associated to a mixer, and a given data channel is selected by means of a bandpass filter BP1. Another bandpass filter BP2 selects another data channel of the same satellite. The down-converter DC2 with the filters BP3 and BP4 performs the same functions for two other data channels coming from the satellite source 21. The assembly DC3+BP5 still performs the same function for a single data channel coming from the satellite source 11. The source 31 may, for example, not have any data channel, or the residents of the premises may not be interested in the data channels it has.

The data channels selected by BP1 and BP2, of which the frequency is lowered, are added together in the cable T by means of a digital signal coupler CN12, those of BP3 and BP4 by a coupler CN34, and those of BP5 by a coupler CN5. As, generally, there are not many terrestrial transmitters suitable for reception at a given point, there is room in the 45–862 MHz range for adding data channels. The couplers CN are arranged upstream of the terrestrial signal couplers CT in the connection T coming from the terrestrial source. These couplers could also be inserted between the antenna 50 and the amplifier 55, or also arranged on the cables 1–4, but in the latter case one would need four times as many of them.

Each user is served by a connection device of which a single one is represented. This connection device comprises a casing 82, generally installed in a stairwell, which leads signals to the user by means of a cable 84 in the lodgings. The casing 82 comprises as many splitters as there are cables, that is to say, four splitters here (which are not shown), known per se for deriving from each cable the plurality of signals of this cable, and means (not shown) also known for connecting the user to one of the four cables 1–4, for example, a commutation switch which is controlled by means of a signal called "DiSEqC" sent by the cable 84.

At the other end of the cable 84 a passive divider 85 known per se makes it possible to supply to two installations all the signals present on the cable. One of these installations comprises, for example, a distributor 93 which has filters for supplying to a receiver/decoder 91 the signals received by satellite and to a television set 92 the signals received from terrestrial stations. A second installation comprises a computer 96 which receives digital data from a modem 95 adapted to the satellite links, by means of an up-converter 94 which, for example, by using reverse means to those of the converter DC1, increases the frequency of the signals so as to bring them back to within the satellite band so that they can be used by the modem 95.

Two outputs could also be provided on the casing 82, with a switch for each of them which permits of selecting a different cable, which would permit of supplying to each one the channel it desires. However, not only that the casing 82 would be more costly, this would also imply the installation of a second cable for a second user, running from the casing 82 to the location where it is used, with partition walls being pierced and other possible degradations.

What is claimed is:

1. A head-end device for a television signal distribution system serving a plurality of user installations, intended to feed at least two downgoing cables and comprising:

a set of various separate sources of television signals transmitted by satellite, called satellite sources, each of the downgoing cables being fed with different signals coming from satellite sources, a source of television signals transmitted by terrestrial channel, called terrestrial source, and couplers, called terrestrial signal couplers, for repeating the signals from the terrestrial source on each of the downgoing cables by adding them to the signals of a satellite source, characterized in that the device comprises at least a down-converter for selecting from a satellite source a signal that transports digital data so as to lower the signal frequency and bring the frequency to within the frequency range of the signals transmitted by the terrestrial source, and at least a coupler, called digital signal coupler, for inserting the signal that has a lowered frequency between those coming from the terrestrial source.

2. A head-end device as claimed in claim 1, characterized in that the digital signal coupler is arranged upstream of the terrestrial signal couplers on a connection coming from the terrestrial source.

3. A user connection device intended to supply signals to a user installation by means of a television signal distribution device as claimed in claim 1, including selection means for selecting one of the downgoing cables and connecting the installation thereto, characterized in that it includes at least an up-converter for up-converting the frequency of the lower-frequency signals which transport digital data and for bringing their frequency to within the frequency range of the signals transmitted by satellite.

4. A user connection device as claimed in claim 3, characterized in that it includes a distributor for producing the signals coming from the selected cable to at least two separate user installations.

\* \* \* \* \*